US009992628B2

(12) United States Patent
Lopez-Uricoechea et al.

(10) Patent No.: US 9,992,628 B2
(45) Date of Patent: Jun. 5, 2018

(54) MAP DOWNLOADING BASED ON USER'S FUTURE LOCATION

(71) Applicant: MICROSOFT TECHNOLOGY LICENSING, LLC, Redmond, WA (US)

(72) Inventors: Rafael Lopez-Uricoechea, Seattle, WA (US); Oliver Colbert, Seattle, WA (US); Silvana Moncayo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 15/135,003

(22) Filed: Apr. 21, 2016

(65) Prior Publication Data
US 2017/0311129 A1   Oct. 26, 2017

(51) Int. Cl.
*H04W 4/02* (2018.01)
*H04L 29/08* (2006.01)
*G01C 21/34* (2006.01)

(52) U.S. Cl.
CPC ........... *H04W 4/028* (2013.01); *G01C 21/34* (2013.01); *H04L 67/2847* (2013.01)

(58) Field of Classification Search
CPC ..... H04W 4/028; G01C 21/34; H04L 67/2847
USPC ........................................................ 701/450
See application file for complete search history.

(56) References Cited

U.S. PATENT DOCUMENTS

| | | | | |
|---|---|---|---|---|
| 6,324,467 | B1 * | 11/2001 | Machii | G01C 21/32 701/420 |
| 6,676,014 | B2 | 1/2004 | Catan | |
| 6,680,919 | B1 * | 1/2004 | Rauhala | H04M 1/72525 342/358 |
| 7,610,149 | B2 * | 10/2009 | Karaoguz | G01C 21/34 340/995.12 |

(Continued)

FOREIGN PATENT DOCUMENTS

EP   2167919 B1   12/2013

OTHER PUBLICATIONS

Dilger, Daniel Eran, "Appleinsider: Apple's new iOS 6 Maps support automatic offline use for a wide area", Published on: Oct. 4, 2012 Available at: http://appleinsider.com/articles/12/10/05/apples-new-ios-6-maps-support-automatic-offline-use-for-a-wide-area.

(Continued)

*Primary Examiner* — Tyler J Lee
(74) *Attorney, Agent, or Firm* — Shook, Hardy & Bacon L.L.P.

(57) ABSTRACT

Methods and systems are provided for facilitating a download of a specific portion of a map onto a computing device based on information received from a location-aware service. Location information, a start date, and an end date associated with travel plans of a user are received from, for example, a location-aware application or service. A download time corresponding to when to download a map portion corresponding to the received location information is determined. At or prior to the download time, it is determined whether the map portion can be downloaded at that particular time based on one or more factors. If the map portion can be downloaded at that time, the map portion is downloaded to a device associated with the user. The map portion is then removed from the device associated with the user on or after the end date.

20 Claims, 5 Drawing Sheets

(56) References Cited

U.S. PATENT DOCUMENTS

| | | | |
|---|---|---|---|
| 8,014,944 B2* | 9/2011 | Lee | G01C 21/32 340/995.1 |
| 8,204,966 B1 | 6/2012 | Mendis et al. | |
| 8,457,653 B2 | 6/2013 | Ledlie | |
| 8,812,031 B2 | 8/2014 | CaveLie et al. | |
| 8,958,818 B2 | 2/2015 | Rose | |
| 8,972,529 B1 | 3/2015 | CaveLie | |
| 9,026,354 B1* | 5/2015 | Persson | G01C 21/32 701/400 |
| 2002/0032521 A1* | 3/2002 | Machii | G01C 21/32 701/532 |
| 2002/0052674 A1* | 5/2002 | Chang | G06F 17/3087 700/300 |
| 2003/0191580 A1* | 10/2003 | Endo | G01C 21/3415 701/420 |
| 2004/0203909 A1* | 10/2004 | Koster | H04W 4/02 455/456.1 |
| 2006/0058952 A1* | 3/2006 | Cooper | G01C 21/26 701/532 |
| 2006/0080031 A1* | 4/2006 | Cooper | G01C 21/32 701/532 |
| 2006/0080032 A1* | 4/2006 | Cooper | G01C 21/32 701/532 |
| 2007/0219708 A1 | 9/2007 | Brasche et al. | |
| 2008/0154499 A1* | 6/2008 | Tanaka | G01C 21/362 701/431 |
| 2009/0281718 A1 | 11/2009 | Gibran et al. | |
| 2010/0175001 A1 | 7/2010 | Lazarus et al. | |
| 2012/0005290 A1 | 1/2012 | Cooper et al. | |
| 2014/0141803 A1* | 5/2014 | Marti | H04W 4/043 455/456.2 |
| 2014/0200038 A1 | 7/2014 | Rao et al. | |
| 2014/0222950 A1 | 8/2014 | Rabel | |
| 2014/0242954 A1 | 8/2014 | Chang et al. | |
| 2015/0099535 A1 | 4/2015 | Bombacino et al. | |

OTHER PUBLICATIONS

"International Search Report and Written Opinion Issued in PCT Application No. PCT/US2017/027835", dated Oct. 12, 2017, 13 Pages.

* cited by examiner

MAP DOWNLOADING BASED ON USER'S FUTURE LOCATION

BACKGROUND

The use of map applications and services has become commonplace for many users, whether users are traveling in familiar or unfamiliar territory. One drawback of the use of these applications and services is that an Internet connection is required, which could be costly for the user. Other approaches to allowing a user to access an offline map require the user to initiate the download, such as requesting that a map be downloaded, and even dictating when the map is to be downloaded. This creates an unnecessary burden on the user.

Further, it is common for device users to travel to areas with low or no cellular data coverage. When users are in these areas, such as when they are on vacation or on a business trip, users have a need to use maps to orient them to the new and possibly unfamiliar location. Users also have the need to search for places and to generally navigate around that location, or from one location to another. Utilizing a map application or service with low or no cellular data coverage can prove to be difficult, impossible, or very expensive. Additionally, users may not think about their need for a map before their travel begins.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein facilitate downloading of a map portion corresponding to a predicted future location of a user. In one embodiment, the predicted future location is travel that the user plans on taking. The future location could be determined from, for example, a location-aware service/application, such as, for instance, a calendar or e-mails from the user's device. Other location-aware services/applications could also provide information if the user's future whereabouts are known. This location information and other information, including start and end dates of the anticipated travel are communicated to a map platform or some other network component. A time to download a map portion and to remove the map portion are determined and scheduled using a task scheduler, which, in one aspect, could be part of the operating system of a user's computing device. The task schedule receives a request from the map platform or other network component to schedule a trigger for both the download and removal of the map portion, and sends the trigger to the map platform at the desired start/end times.

BRIEF DESCRIPTION OF THE DRAWINGS

Aspects of the technology described in the present application are described in detail below with reference to the attached drawing figures, wherein.

DETAILED DESCRIPTION

Figure 1:
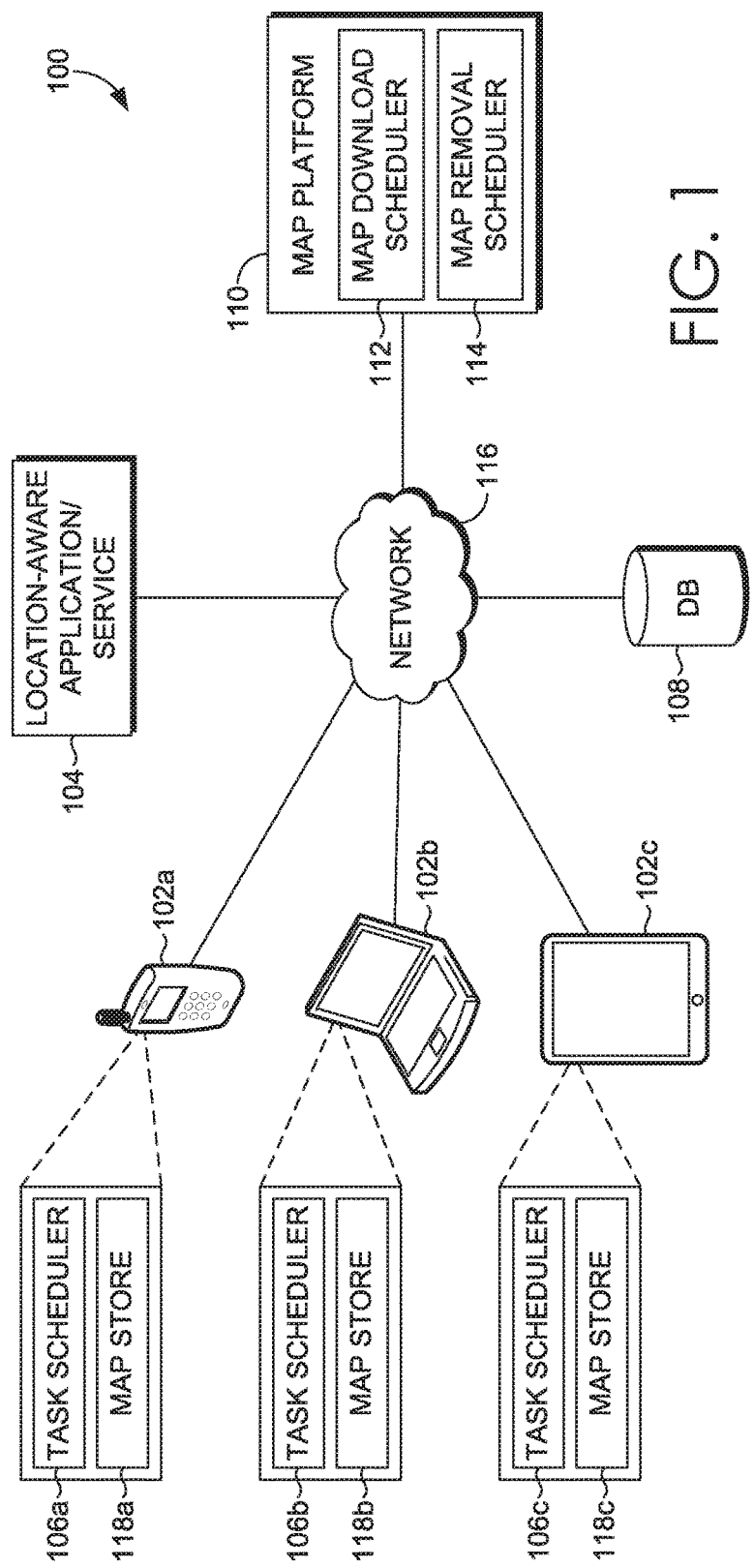
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein allow for maps to be downloaded onto a user's device so that they are accessible while the device is offline. In some instances, the user does not request to have the map portions downloaded and may not even provide any details regarding when the future travel will occur. Instead, a location-aware application/service is able to learn when the user plans to travel, and communicates this information to a network component, such as a map platform having a map download scheduler and a map removal scheduler. Many people travel to areas with low or no cellular data coverage. In these areas, maps may be desired or even required by the user to get to locations within that particular area. Maps can be used to orient the user, search for places, and navigate within an unfamiliar territory.

As such, utilizing embodiments herein, a location-aware application or service, such as a digital personal assistant, a calendar, e-mail, or an airline application, can predict or know that a user will be traveling. With this information, an optimal time to download relevant maps for the destination and an optimal time to remove them can be scheduled. There are many advantages to utilizing downloaded maps on a device, in contrast to requiring the user to access them using some type of a connection through the Internet. For instance, the user is able to access a downloaded map even when offline, whether intentionally offline or whether cell service is not available at a particular location. For the user, access to a downloaded map has enormous advantages. An additional advantage of the embodiments provided herein is that the user does not need to request a map to be downloaded, or even provide location information. Location-aware services/applications proactively suggest to a map platform to download a specific portion of the world based on future whereabouts of a user. This may not require any user interaction. Additionally, the location-aware services/applications are able to manage the lifecycle of a map that has been downloaded to a user's device given an end date/time of the user's travel.

In one aspect, a location-aware application/service will know where and when a user is traveling based on its own heuristics. For instance, the user may have made an airline reservation or a calendar appointment. The application/service is then able to pass this information to a map platform, which may include, for example, latitude-longitude (lat-long) coordinates for the destination and a start date, which represents the time that the map is required to be on the device (e.g., departure date for a flight), in addition to an end date, which represents the time that the map is no longer required to be on the device (e.g., return date for the flight). The map platform is able to convert the lat-long coordinates into one or more package identifiers, which are an internal representation for the corresponding offline maps.

The map platform may leverage a task scheduler to set up triggers for some time before the start date (e.g., 2 days, 3 days, 5 days). The task scheduler, in one embodiment, is part of an operating system on the user's device. When the task scheduler triggers the map platform and it is time to download the map, a check for optimal conditions is performed. This may include factors such as whether a free network connection is available, power conditions, and available storage on the user's device. If the conditions pass threshold requirements, the map download is queued to download. In aspects, user confirmation may be sought to ensure the user is the one traveling and would like an offline map available during the travel. If the conditions do not pass a threshold requirement (e.g., no free network available) and the start date is less than some time threshold away (e.g., 24 hours), the user may be notified of the situation. Similarly, the map platform may use the task scheduler to be notified of the end date so it can remove the map and recover storage space on the device. The conditions listed above may not be consulted for removal of a map.

According to a first aspect herein, a method for facilitating a download of a specific portion of a map onto a computing device based on information received from a location-aware service is provide. The method comprises receiving, from the location-aware service, location information, a start date associated with travel plans of a user, and an end date associated with the travel plans of the user and determining a download time for downloading a map portion corresponding to the received location information. Further, the method includes, at or prior to the download time, inspecting one or more factors to determine if the map portion can be downloaded at that time and if it determined that the map portion can be downloaded at that time, downloading the map portion to a device associated with the user. Also, the method includes removing the map portion from the device associated with the user subsequent to the end date associated with the travel plans of the user.

According to a second aspect herein, a system is provided for facilitating a download of a specific portion of a map onto a computing device based on information received from a location-aware service. The system comprises a map scheduler having one or more processors and one or more computer-readable storage media, the map scheduler configured to: receive, from the location-aware service, location information, a start date, and an end date associated with travel plans of a user. The map scheduler is further configured to, based on one or more factors and the received start date, determine that a map portion can be downloaded at that time to a device associated with the user, download the map portion to a device associated with the user, and remove the map portion from the device associated with the user on or after the end date.

According to a third aspect herein, one or more computer storage hardware devices having computer-executable instructions embodied thereon that, when executed, facilitate a download of a specific portion of a map onto a computing device based on information received from a location-aware application or service. The method comprises receiving, from the location-aware application or service, a start date, an end date, and location information associated with an upcoming travel for a user. Further, the method comprises scheduling a download time corresponding to a download of a map portion to a device associated with the user, thus allowing the map portion to be accessed by the user offline, and scheduling a removal time corresponding to a removal of the map portion from the device associated with the user such that the map portion is no longer stored on the device.

Having briefly described an overview of aspects of the technology described herein, an exemplary operating environment suitable for use in implementing the technology is described below.

Exemplary Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a, 102b, and 102c; location-aware application/service 104; a map platform 110; and a database 108. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 116, which may include, without limitation, one or more local area networks (LANs) and/or wide area networks (WANs). In exemplary implementations, network 116 comprises the Internet and/or a cellular network, amongst any of a variety of possible public and/or private networks.

User devices 102a, 102b, and 102c can be user devices on the client-side of operating environment 100, while the other components illustrated in FIG. 1, with the exception of the location-aware application/service 104, can be on the server-side of operating environment 100. The user devices are provided with map portions corresponding to information provided by a location-aware application/service 104, which could be any type of application or service, such as one available by way of the Internet, that is able to ascertain a user's future location, such as using the user's location for providing coupons, weather information, maps, etc. These map portions may be provided to the user's device by way of the map platform 110 over the network 116.

User devices 102a, 102b, and 102c may comprise any type of computing device capable of use by a user. For example, in one aspect, user devices 102a, 102b, and 102c may be the type of computing device 500 described in relation to FIG. 5 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device. The user devices have the capability to display or read a map, such as a map portion downloaded onto the devices, accessible to users even when the devices are offline.

As mentioned, the location-aware application/service 104 is able to ascertain a user's future location, such as using the user's future location for providing coupons, weather information, maps, scheduling, etc. This application/service 104 may use a calendar, e-mail system, and other available components on a user's device to determine that a user is planning to travel in the future. In one aspect, the location-aware application/service 104 could be the calendar application, e-mail application, etc., itself, but could also be a separate component that gathers data from a user's installed applications/services.

The task scheduler 106a, 106b, and 106c on each of devices 102a, 102b, and 102c, respectively, in one embodiment, is a component of a device's operating system, and thus may be located on each device. As shown in FIG. 1, each user device 102a, 102b, and 102c includes a task scheduler, labeled as items 106a, 106b, and 106c. These task schedulers communicate, by way of the network 116, with the map platform 110 and the database 108 to alert the map platform 110 when to download and remove map portions from user devices. For instance, in one embodiment, the map platform 110 requests a trigger from the task scheduler (items 106a, 106b, and 106c) for a particular user device. The task scheduler receives this request and at the appropriate time (based on the user's information sent from the location-aware application/service 104) will send a trigger back to the map platform 110, indicating that the map portion is to be downloaded to the user's device at that time. Each device 102a, 102b, and 102c also includes a map store, 118a, 118b, and 118c, respectively. The map store is generally responsible for storing the map portions that are downloaded onto the device. Map portions, when removed from devices, are removed from the map store.

The map platform 110 includes at least two components, including a map download scheduler 112 and a map removal scheduler 114. These components may be on the network side, and work together to determine the appropriate times to download and remove a map portion from a user's device. For instance, the map download scheduler 112 may be responsible for scheduling a time to download a map corresponding to location information received from the location-aware application/service 104, and actually download the map portion at that determined time. The map download scheduler 112 may also determine an optimal date and time for the map download. The map removal scheduler 114 may be responsible for determining the optimal date and time for removing a downloaded map portion from a user device. In general, the map portion is removed from a user's device on or after the end date of the user's travel. This information is received from the location-aware application/service 104. In embodiments, maps and/or map portions are stored in a database 108. In one aspect, the map platform is responsible for generating a map portion from a map.

Prior to the map being downloaded onto a device, various factors are considered, including network conditions, power conditions of the user's device, storage availability on the user device, or the like. In embodiments, these conditions are checked just before the map is downloaded, such as within a predetermined threshold of time (e.g., 1 hour, 2 hours). If any of these conditions do not pass a threshold, the map may not be downloaded at that time. The system could keep monitoring these conditions and download the map portion at a time when all or most monitored conditions pass the predetermined threshold.

Figure 2:
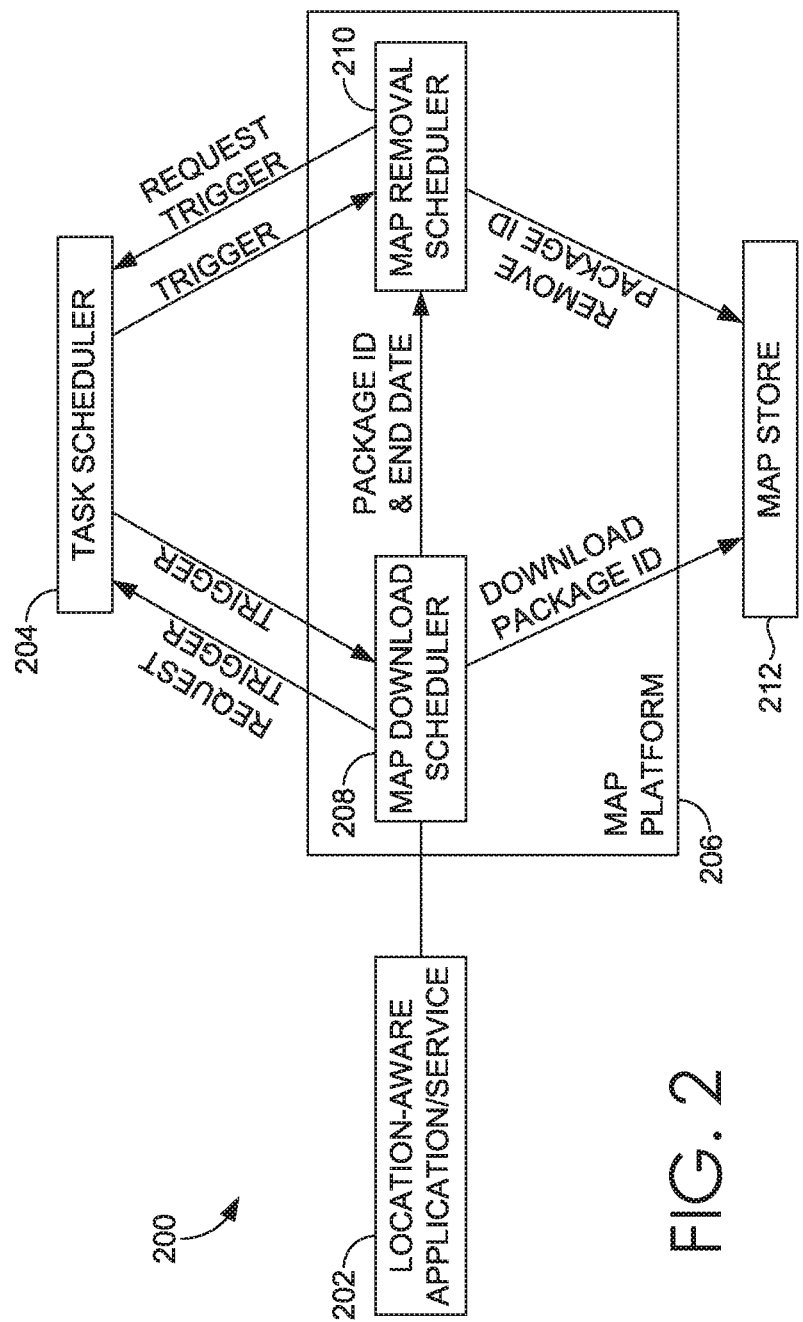
FIG. 2 is a diagram depicting an exemplary computing environment for proactively downloading a specific portion of a map onto a user device based on information received from a location-aware service, in accordance with an aspect of the technology described herein.

Referring to FIG. 2, a diagram depicting an exemplary computing environment 200 is depicted for proactively downloading a specific portion of a map onto a user device based on information received from a location-aware service, in accordance with an aspect of the technology described herein. The components illustrated in FIG. 2 have been described herein in relation to FIG. 1, and thus will not be described again for the sake of brevity. However, FIG. 2 illustrates the flow of information. For example, the location-aware application/service 202 is able to ascertain future location information for a particular user. This could be an event on the user's calendar that is to take place in a geographical location that is not where the user typically resides, or it could be an e-mail indicating that the user will be traveling for a particular time frame, or the like.

In one aspect, the location-aware application/service 202 communicates the information to a map platform 206, and particularly to a map download scheduler 208 within the map platform 206. This information may include, in embodiments, location information, a start time, and an end time corresponding to a user's future travel. In some embodiments, the information may just include in indication of the user's future location and a start time. The location information could be in the form of latitudinal/longitudinal coordinates corresponding to the start and/or end of the anticipated travel, or could be the name of a geographical location, such as the geographical location where the travel is to begin, and the location where the travel is to end. The start and end times could be dates, dates and times of day, etc.

The map download scheduler 208 receives the information from the location-aware application/service 202 and is then able to schedule a date and/or time to download a map corresponding to the location information. The map download scheduler 208 communicates a request trigger to the task scheduler 204. As mentioned, the task scheduler 204 may be a component of a device's operating system. The task scheduler 204 then knows to send a trigger back to the map download scheduler 208 when it becomes time for the map download scheduler 208 to download a map portion from the map store 212. In an embodiment, the request trigger is a message or signal that provides an indication to the task scheduler 204 as to what date and/or time at which the map is to be downloaded. The task scheduler 204 stores this information so that it can trigger (by way of a message, signal, etc.) the map download scheduler 208 to download the map portion on to the user's device. As indicated here, the task scheduler may be part of an operating system on a user's device.

Similar to the map download scheduler 208, the map removal scheduler 210 communicates a request trigger to the task scheduler 204, which provides the task scheduler 204 with an indication of when then map portion is to be removed from the device. The task scheduler 204 then triggers (e.g., message, signal) the map removal scheduler 210 upon it becoming time to remove the map portion from the device. Upon receiving the information from the location-aware application/service 202, the map download scheduler 208 may assign that information a package identifier. That package identifier identifies the map portion that is to be downloaded onto the user's device. This package identifier may be communicated to the map removal scheduler 210, along with the date and/or time at which the map portion is to be removed from the device.

Generally, the map store 212 is responsible for storing maps that have been downloaded onto user devices. As such, in embodiments, the map store 212 is located on the user's device, as shown in FIG. 1. Once the map download scheduler 208 receives the trigger from the task scheduler 204, the map portions is downloaded to the map store 212 on the user's device. Similarly, upon the map removal scheduler 210 receiving the trigger from the task scheduler 204, the map removal scheduler 210 removes the map portion from the map store 212 on the user's device.

Figure 3:
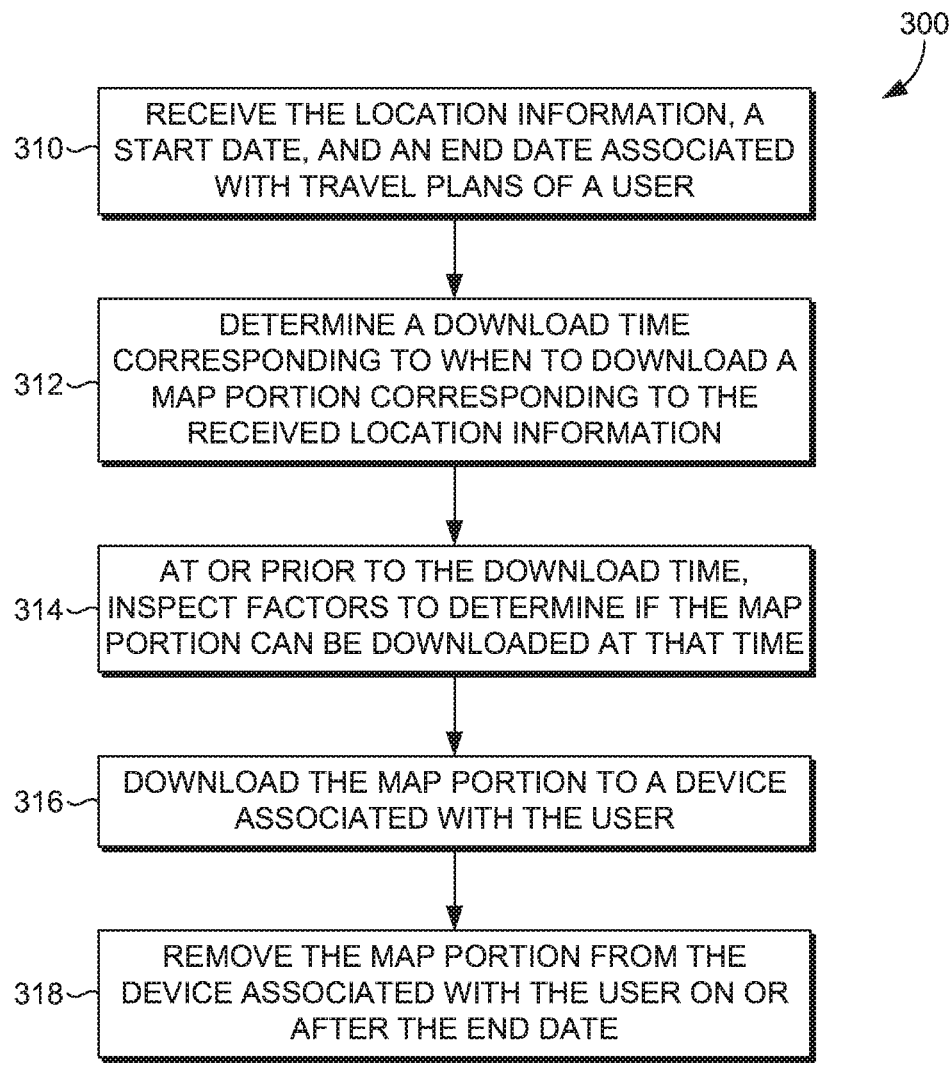
FIG. 3 is a flow diagram depicting a method for facilitating a download of a specific portion of a map onto a computing device based on information received from a location-aware service, in accordance with an aspect of the technology described herein.

Turning now to FIG. 3, a flow diagram is illustrated depicting a method 300 for facilitating a download of a specific portion of a map onto a computing device based on information received from a location-aware service, in accordance with an aspect of the technology described herein. Initially at block 310, location information, a start date, and an end date associated with travel plans of a particular user are received. In embodiments, this information is received without a request for the information. For instance, location-aware applications/services may constantly be monitoring or looking for any indication that a user will be traveling in the future without receiving a request to look for this information. This allows aspects herein to proactively download map portions to a user's device without the need for a user or some component of the user's device or the network to send a request for the needed information. Location information could include one or more of the name of a city, state, or country, a zip code, an area code, latitudinal/longitudinal coordinates, or the like. Further, the location information could include both a starting location and an ending location associated with the user's travel plans, or could be just the start date without an end date. The start date could be just a date that the user is predicted to start his/her travel, a time and a date, etc. The end date, like the start date, could include a date or a time and a date that the user is predicted to end his/her travel. In embodiments, this information could come from a location-aware application/service, such as a user's calendar, e-mail, etc. For example, if the user has a block of time on his calendar stating he will be in Paris during that time, that information, including location information and start/end times/dates, could be sent to a map platform.

At block 312, a download time corresponding to when to download a map portion is determined, which may occur on or prior to the received start date. The map portion that is downloaded corresponds to the location information received from, for example, a location-aware application/service. At block 314, at or prior to the download time, one or more factors are inspected to determine if the map portion can be downloaded at that time. These factors may include, for example, network conditions, power conditions of the device, and other conditions that would give rise to an optimal date/time for downloading the map portion. In one embodiment, the download may not occur if one or more of the factors do not pass a predetermined threshold. In this case, the system could monitor the factors and download the map portion when the factors do pass the threshold.

At block 316, at the determined download time, the map portion is downloaded to a device associated with the user. The map portion could be downloaded to just a single device, or could be downloaded to multiple devices associated with the user. In aspects, a data store is responsible for storing all maps that can be downloaded, and as such, a map platform may retrieve the map portion from a data store and download the map portion to, for example, a map store on the user device. At block 318, the map portion is removed from the user's device(s) on or after the end date received, for example, from the location-aware application/service. The removal of the map portion from the user's device(s) may be based on a determination as to the optimal time to remove it. This would likely occur on or after the received end date.

In some embodiments, the user may receive an alert or some other notification on his/her associated device indicating that a map will be downloaded to the device at a particular download time based on the user's anticipated travel plans. This could allow the user to accept or deny the download of the map portion. For instance, it is a possibility that a user could have another person's (spouse, boss) travel plans on his/her calendar. In that case, the user would not want or need a map to be downloaded on the device, where it would take up unnecessary resources.

Additionally, in some embodiments, the map platform or a component thereof is responsible for generating a map portion from a map that covers a larger geographical area than what is needed to be downloaded to the user's device. The map portion may cover a geographical area corresponding to the location information of the user's travel, which may have been received from a location-aware application/service. For example, a map may be available of France, but if a user plans to travel only in Paris, any areas outside of Paris may not be needed by the user, and thus could be deleted by the map platform or a component thereof prior to downloading the map portion on the user's device.

Figure 4:
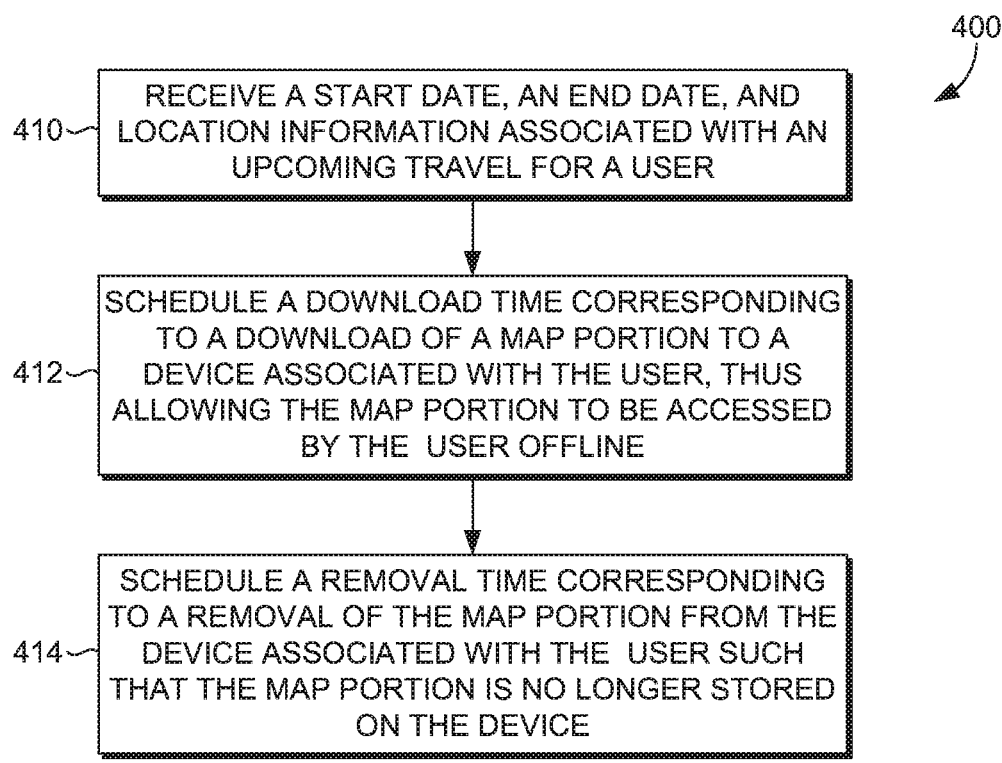
FIG. 4 is a flow diagram depicting a method for facilitating a download of a specific portion of a map onto a computing device based on information received from a location-aware service, in accordance with an aspect of the technology described herein.

FIG. 4 is a flow diagram depicting another method 400 to facilitating a download of a specific portion of a map onto a computing device based on information received from a location-aware service, in accordance with an aspect of the technology described herein. At block 410, a start date, an end date, and location information are received. This information is associated with an upcoming travel for a particular user. In one aspect, this information is received from a location-aware application/service. At block 412, a start time corresponding to a download of a map portion to a device is scheduled. The download of the map portion allows it to be accessible by the user, even when the user is offline. Once there is a start time scheduled, the map portion is downloaded at the start time. In one embodiment, landmarks may be added to the downloaded map portion based on whether the user has been to that location before, or the reason for the user's travel. For instance, if the user is traveling on business, the user may be more interested in restaurants than in cultural landmarks, but would be interested in both if the user is traveling for pleasure.

At block 414, an end time corresponding to a removal of the map portion from the device is scheduled such that the map portion is no longer stored on the device. Once an end time is scheduled, the map portion can be removed from the user device at that time.

Figure 5:
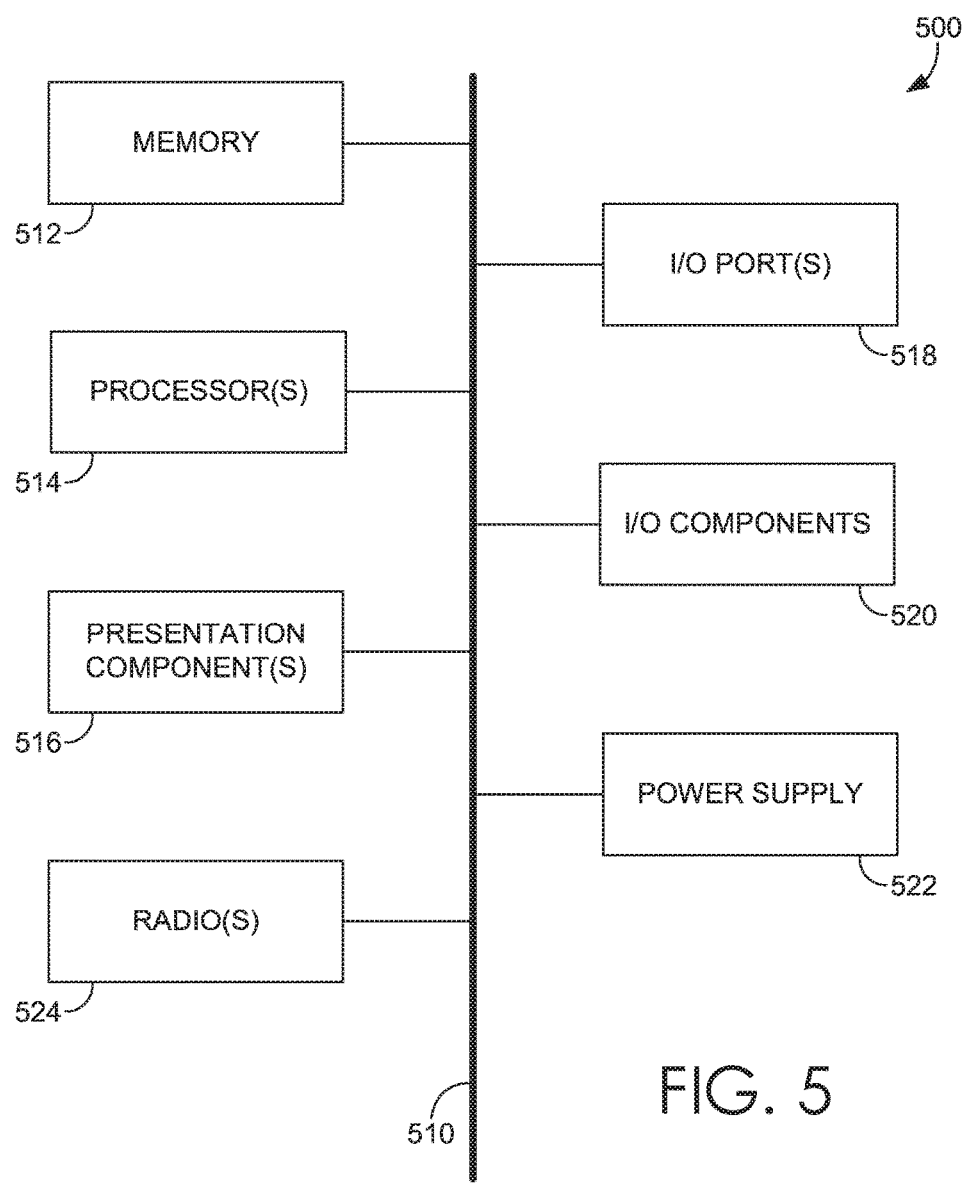
FIG. 5 is a block diagram of an exemplary computing environment suitable for implementing aspects of the technology described herein.

Referring to FIG. 5, an exemplary operating environment for implementing aspects of the technology described herein is shown and designated generally as computing device 500. Computing device 500 is just one example of a suitable computing environment and is not intended to suggest any limitation as to the scope of use of the technology described herein. Neither should the computing device 500 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 5 and refer to "computer" or "computing device." The computing device 500 may be a PC, a tablet, a smartphone, virtual reality headwear, augmented reality headwear, a game console, and such.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512, or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices, including I/O components 520, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 500. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

The computing device 500 may include a radio 524. The radio transmits and receives radio communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS SECTION

Embodiment 1

A method for facilitating a download of a specific portion of a map onto a computing device based on information received from a location-aware service, the method comprising: receiving, from the location-aware service, location information, a start date associated with travel plans of a user, and an end date associated with the travel plans of the user; determining a download time for downloading a map portion corresponding to the received location information; at or prior to the download time, inspecting one or more factors to determine if the map portion can be downloaded at that time; if it determined that the map portion can be downloaded at that time, downloading the map portion to a device associated with the user; and removing the map portion from the device associated with the user subsequent to the end date associated with the travel plans of the user.

Embodiment 2

The method of Embodiment 1, wherein the one or more factors comprise one or more of an optimal date, network conditions, power conditions of the device, or storage conditions of the device.

Embodiment 3

The method of any of the above Embodiments, wherein the location information comprises one or more of a location associated with a starting location and a location associated with an ending location of the travel plans of the particular user.

Embodiment 4

The method of any of the above Embodiments, wherein the location comprises latitude and longitude values.

Embodiment 5

The method of any of the above Embodiments, further comprising downloading the map portion onto a map store located on the user device.

Embodiment 6

The method of any of the above Embodiments, further comprising assigning a package identifier to the map portion.

Embodiment 7

The method of any of the above Embodiments, further comprising communicating for presentation a notification to the device associated with the particular user alerting the particular user that the map portion will be downloaded onto the device at the download time.

Embodiment 8

The method of any of the above Embodiments, wherein the notification allows the particular user to accept or reject the downloading of the map portion.

Embodiment 9

The method of any of the above Embodiments, wherein the download time occurs prior to the start date.

Embodiment 10

The method of any of the above Embodiments, wherein the location information, the start date, and the end date associated with travel plans of the user are received from the location-aware service without a request for the information.

Embodiment 11

The method of any of the above Embodiments, further comprising, based on the received end date, determining when to remove the map portion from the device.

Embodiment 12

A system facilitating a download of a specific portion of a map onto a computing device based on information received from a location-aware service, the system comprising: a map scheduler having one or more processors and one or more computer-readable storage media, the map scheduler configured to: receive, from the location-aware service, location information, a start date, and an end date associated with travel plans of a user; based on one or more factors and the received start date, determine that a map portion can be downloaded at that time to a device associated with the user; download the map portion to a device associated with the user; and remove the map portion from the device associated with the user on or after the end date.

Embodiment 13

The system of Embodiment 12, wherein the map portion is downloaded onto a map store located on the device associated with the user.

Embodiment 14

The system of Embodiments 12 or 13, wherein the one or more factors comprise one or more of an optimal date, network conditions, power conditions of the device, or storage conditions of the device.

Embodiment 15

One or more computer storage hardware devices having computer-executable instructions embodied thereon that, when executed, facilitate a download of a specific portion of a map onto a computing device based on information received from a location-aware service, the method comprising: receiving, from the location-aware application or service, a start date, an end date, and location information associated with an upcoming travel for a user; scheduling a download time corresponding to a download of a map portion to a device associated with the user, allowing the map portion to be accessed by the user offline; and scheduling a removal time corresponding to a removal of the map portion from the device associated with the user such that the map portion is no longer stored on the device.

Embodiment 16

The one or more computer storage hardware devices of Embodiment 15 further comprising downloading the map portion to the device.

Embodiment 17

The one or more computer storage hardware devices of any of Embodiments 15 or 16, further comprising adding landmarks to the downloaded map portion.

Embodiment 18

The one or more computer storage hardware devices of any of Embodiments 15, 16, or 17, further comprising removing the map portion from the device.

Embodiment 19

The one or more computer storage hardware devices of any of Embodiments 15, 16, 17, or 18, further comprising at or prior to the download time, determining whether the map portion can be downloaded to the device based on one or more factors, the one or more factors comprising at least one of an optimal date, network conditions, power conditions of the device, or storage conditions of the device.

Embodiment 20

The one or more computer storage hardware devices of any of Embodiments 15, 16, 17, 18, or 19, wherein the removal time occurs on or after the end date.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method for facilitating a download of a specific portion of a map onto a computing device based on information received from a location-aware service, the method comprising:
receiving, at a map platform on a network, location information from the location-aware service on a device associated with a user and in communication with the network, a start date associated with travel plans of the user, and an end date associated with the travel plans of the user;
determining, by the map platform on the network, a download time for downloading a map portion corresponding to the received location information;
at or prior to the download time, inspecting one or more factors to determine if the map portion can be downloaded at that time;
if it is determined that the map portion can be downloaded at that time, downloading the map portion to the device associated with the user;
scheduling a removal time for removal of the map portion from the device associated with the user, wherein the removal time is scheduled to occur subsequent to the end date associated with the travel plans of the user; and
removing the map portion from the device associated with the user based on a determination that the scheduled removal time has occurred.

2. The method of claim 1, wherein the one or more factors comprise current network conditions, current power conditions of the device, or current storage conditions of the device.

3. The method of claim 1, wherein the location information comprises one or more of a location associated with a starting location or a location associated with an ending location of the travel plans of the user.

4. The method of claim 3, wherein the location comprises latitude and longitude values.

5. The method of claim 1, further comprising downloading the map portion onto a map store located on the user device.

6. The method of claim 1, further comprising assigning a package identifier to the map portion.

7. The method of claim 1, further comprising communicating for presentation a notification to the device associated with the user alerting the particular user that the map portion will be downloaded onto the device at the download time.

8. The method of claim 7, wherein the notification allows the user to accept or reject the downloading of the map portion.

9. The method of claim 1, wherein the download time occurs prior to the start date.

10. The method of claim 1, wherein the location information, the start date, and the end date associated with travel plans of the user are received, at the map platform on the network, from the location-aware service on the device associated with the user without a request for the information.

11. A system facilitating a download of a specific portion of a map onto a computing device based on information received from a location-aware service, the system comprising:
a map scheduler on a network having one or more processors and one or more computer-readable storage media, the map scheduler configured to:
receive, at a map platform on the network, from the location-aware service on a device associated with a user, location information, a start date, and an end date associated with travel plans of the user;
based on one or more factors and the received start date, determine, by the map platform on the network, that a map portion can be downloaded at that time to the device associated with the user;
download the map portion to the device associated with the user;

schedule a removal time for removal of the map portion from the device associated with the user, wherein the removal time is scheduled to occur on or after the end date; and remove the map portion from the device associated with the user based on the scheduled removal time.

12. The system of claim 11, wherein the map portion is downloaded onto a map store located on the device associated with the user.

13. The system of claim 11, wherein the one or more factors comprise one or more of an optimal date, network conditions, power conditions of the device, or storage conditions of the device.

14. One or more computer storage hardware devices having computer-executable instructions embodied thereon that, when executed, facilitate a download of a specific portion of a map onto a computing device based on information received from a location-aware application or service, the method comprising:

receiving, at a map platform on a network, from the location-aware application or service, a start date, an end date, and location information associated with an upcoming travel for a user;

scheduling, by the map platform on the network, a download time corresponding to a download of a map portion to a device associated with the user, thus allowing the map portion to be accessed by the user offline; and scheduling a removal time corresponding to a removal of the map portion from the device associated with the user such that the map portion is no longer stored on the device, wherein the removal time is scheduled to occur on or after the end date.

15. The one or more computer storage hardware devices of claim 14, further comprising downloading the map portion to the device.

16. The one or more computer storage hardware devices of claim 15, further comprising adding landmarks to the downloaded map portion.

17. The one or more computer storage hardware devices of claim 14, further comprising removing the map portion from the device.

18. The one or more computer storage hardware devices of claim 14, further comprising at or prior to the download time, determining whether the map portion can be downloaded to the device based on one or more factors, the one or more factors comprising at least one of an optimal date, network conditions, power conditions of the device, or storage conditions of the device.

19. The one or more computer storage hardware devices of claim 14, wherein scheduling the removal time comprises communicating a request trigger to a task scheduler, wherein the request trigger provides the task scheduler with an indication of the removal time.

20. The one or more computer storage hardware devices of claim 19, the method further comprising:

receiving a trigger from the task scheduler responsive to an occurrence of the removal time; and in response to the trigger, removing the map portion from the device associated with the user.

* * * * *